United States Patent
Heger et al.

(10) Patent No.: US 8,274,174 B2
(45) Date of Patent: Sep. 25, 2012

(54) CIRCUIT ARRANGEMENT FOR SUPPLYING POWER TO CONTROL DEVICES IN MOTOR VEHICLES

(75) Inventors: Thomas Heger, Altenstadt (DE); Rainer Bonss, Buechenbach (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/451,451

(22) PCT Filed: May 9, 2008

(86) PCT No.: PCT/EP2008/003727
§ 371 (c)(1),
(2), (4) Date: Feb. 23, 2010

(87) PCT Pub. No.: WO2008/138549
PCT Pub. Date: Nov. 20, 2008

(65) Prior Publication Data
US 2010/0141029 A1    Jun. 10, 2010

(30) Foreign Application Priority Data
May 15, 2007 (DE) .......................... 10 2007 022 766

(51) Int. Cl.
*B60D 1/62* (2006.01)
*B60Q 11/00* (2006.01)

(52) U.S. Cl. ........................................ 307/9.1; 307/10.1

(58) Field of Classification Search ................... 307/9.1, 307/10.1
See application file for complete search history.

(56) References Cited

U.S. PATENT DOCUMENTS
| | | |
|---|---|---|
| 5,508,872 A | 4/1996 | Khoo et al. |
| 5,604,439 A * | 2/1997 | Walkington et al. .......... 324/504 |

FOREIGN PATENT DOCUMENTS
| | | |
|---|---|---|
| DE | 10 2004 008 935 | 9/2005 |
| DE | 20 2005 016 686 | 1/2006 |
| DE | 102007022766 | 9/2008 |
| EP | 0 923 274 | 6/1999 |
| GB | 2 284 314 | 5/1995 |

OTHER PUBLICATIONS

European Patent Office, International Preliminary Report on Patentability, Nov. 26, 2009, from International Patent Application No. PCT/EP2008/003727, filed on May 9, 2008.
European Patent Office, Translation of International Preliminary Report on Patentability, Dec. 17, 2009, from International Patent Application No. PCT/EP2008/003727, filed on May 9, 2008.

\* cited by examiner

*Primary Examiner* — Jared Fureman
*Assistant Examiner* — Adi Amrany
(74) *Attorney, Agent, or Firm* — Kenyon & Kenyon LLP

(57) ABSTRACT

A circuit arrangement for supplying power to control devices in motor vehicles, having a first power supply line, a first ground line, a second power supply line and a second ground line, characterized in that the first ground line and the second ground line can be connected by a controllable switch, and in that a logic circuit closes the switch when the first ground line is faulty or interrupted.

18 Claims, 3 Drawing Sheets

CIRCUIT ARRANGEMENT FOR SUPPLYING POWER TO CONTROL DEVICES IN MOTOR VEHICLES

FIELD OF THE INVENTION

The present invention relates to a circuit arrangement for supplying power to control devices in motor vehicles.

BACKGROUND INFORMATION

German patent document DE 20 2005 016 686 U1 discusses an electrical power supply to an electronic brake system of a trailer, in which an electronic brake system which is arranged in the trailer can be supplied with power via two different cables. One of the cables serves to supply power to the trailer brake lights and has a branch which leads to the electronic brake controller. The second cable has a separate cable for the electronic brake controller. If said second cable is not connected or correct power supply cannot be ensured for other reasons, electrical power is applied to the electronic control device via the first cable at least during a braking operation.

German patent document DE 10 2004 008 935 A1 discusses an apparatus for redundant voltage supply for a control device in an on-board vehicle electrical system having two lines, of which the first is designed as a main connection for transferring all the power, while the second line is configured as an emergency supply line and is designed such that only relatively low power consumption is possible. The two lines are decoupled by diodes.

In accordance with the Agreement Concerning The Adoption Of Uniform Technical Prescriptions For Wheeled Vehicles, §5.1.3.6 of ECE R13 allows the alternative supply of electrical power to an electronic brake system (EBS) in the trailer vehicle via a plug-type connection according to ISO standard 1185/ISO standard 12098, with this type of supply having to be restricted to the case of "failure of the electrical power supply via the plug-type connection according to ISO 7638".

In order to clarify the addressed problem, FIG. 2 shows an electronic control device 1 with five connection pins P1-P5. The connection pin P1 is connected to battery voltage and is wired in accordance with ISO 7638 (PIN 1 there). PIN 2 is connected to the brake light according to ISO 1185 (PIN 4 there) and is likewise supplied with supply voltage when a brake light switch (not illustrated) is operated. These two supply voltages are decoupled by diodes D1 and D2.

PIN P3 is wired in accordance with ISO 7638 (PIN 2 there). PIN P4 is connected to ground, specifically in accordance with ISO 7638 (PIN 4 there), while PIN P5 is wired in accordance with ISO 1185 (PIN 1 there) and is likewise connected to ground. PIN P3 is wired in accordance with ISO 7638 (PIN 2 there) and is accordingly connected to supply voltage when the ignition (IGN) is switched on. The PINs P1 and P4 and also P2 and P5 therefore each form a power supply for the electronic control device 1, so that redundant power supply is present. The ground connections of the two redundant power supplies by ISO 7638 and ISO 1185 must not be directly connected to one another, that is to say the connection illustrated by a dashed-line circle K1 is impermissible since otherwise an electrical load, for example a vehicle lighting system L2, reacts to the electronic control device 1 and therefore a brake system and also is effective when there is no fault.

On account of the relatively large cross section of the ground line of the ISO 7638 plug-type connection (PIN P4), a compensation current I2 would flow in the illustrated direction, as a result of which an additional voltage drop across the ground connection of the ISO 7638 plug-type connection (PIN P4) would be caused, this resulting in an increase in the ground potential, that is to say the common potential of PINs P4 and P5. Depending on the magnitude of the actual supply voltage at PIN P1, this could lead to an undervoltage of the electronic control device 1. If the ground line to PIN P5 is interrupted, this being indicated by the interruption point B1, the current I1 can no longer flow away via said ground line, and therefore amplifies this effect since the entire current can then flow away only as current I3 via the ground line of PIN P4.

L1 denotes a brake light which is situated between PINs P2 and P5. L2 indicates a vehicle lighting system, of which the ground connection is connected to PIN P5.

FIG. 3 shows the system which has been used to date to solve the problem described in conjunction with FIG. 2. The two ground lines to PINs P4 and P5 are decoupled by diodes D5 and D6, and therefore the current I2 shown in FIG. 2 can no longer flow.

However, decoupling by diodes D5 and D6 results in the following disadvantages:

the internal ground potential M1 is raised by the voltage drop across diodes D5 and D6;

the maximum continuous current is restricted since, otherwise, an excessively high power loss is produced in diodes D5 and/or D6;

the availability of the electronic control device 1 is reduced by the diode voltage of the diodes D5 and D6;

the current of the electronic control device 1 can also flow away via the brake light ground connection (ground line to PIN P5) and not only, as would be correct, via PIN P5, that is to say the ground line according to ISO 7638.

SUMMARY OF THE INVENTION

The above-described disadvantages are to be eliminated by the exemplary embodiments and/or exemplary methods of the present invention. An object of the exemplary embodiments and/or exemplary methods of the present invention is therefore to improve the circuit arrangement for power supply to control devices in motor vehicles in such a way that high currents to the control device are possible and, at the same time, guaranteed power supply to the control device is ensured even in the event of a fault.

The problem is solved by the features specified herein. Advantageous refinements and developments of the exemplary embodiments and/or exemplary methods of the present invention can be gathered from the further descriptions herein.

Therefore, the exemplary embodiments and/or exemplary methods of the present invention provides for conducting a first ground line directly, that is to say without decoupling diodes, and activating a second ground line via an electrical switch only when a logic circuit has identified a fault in the first ground line.

Therefore, the decoupling diodes of FIG. 3 are eliminated, and the power losses of said decoupling diodes no longer limit the maximum possible current. This also prevents the second ground line raising the potential of the first ground line and as a result reducing the available supply voltage to the control device. Nevertheless, a second ground line which is activated when there is a fault in the first ground line or the first ground line fails, provides increased security.

The switch between the two ground lines electrically isolates, and therefore completely decouples, the two ground lines during fault-free operation.

According to one development of the exemplary embodiments and/or exemplary methods of the present invention, the switch may be a relay. According to another exemplary embodiment, the switch can be realized by two field-effect transistors which are connected back-to-back in series and in which the reverse diodes are connected back to back.

The exemplary embodiments and/or exemplary methods of the present invention will be explained in detail below with reference to an exemplary embodiment in conjunction with FIG. 1.

DETAILED DESCRIPTION

Figure 1:
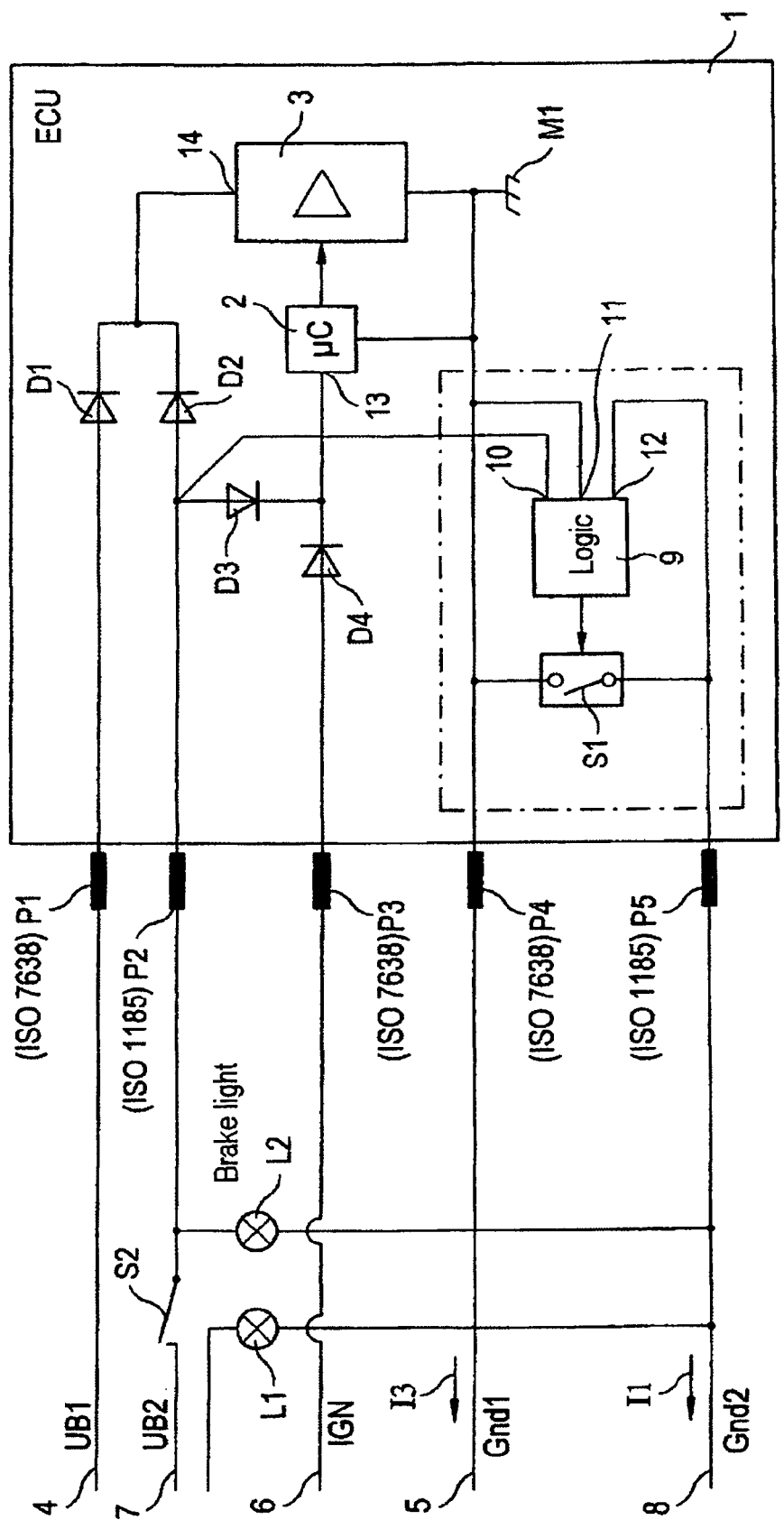
FIG. 1 shows a basic circuit diagram of the circuit arrangement according to the present invention.

FIG. 1 shows an electronic controller 1 which likewise has five PINs P1 to P5. The connection pin P1 can be connected to a first line 4 to which battery voltage UB1 is applied and is assigned in accordance with ISO 7638 in accordance with PIN 1 there.

PIN P4 can be connected to a first ground line 5 and is assigned in accordance with ISO 7638 (PIN 4 there).

PIN P3 can be connected to a line 6 and is assigned in accordance with ISO 7638 (PIN 2 there). When the ignition (IGN) of the vehicle is switched on, battery voltage is applied to the line 6.

PIN P2 can be connected to a second power supply line 7 and is assigned battery voltage UB2 in accordance with ISO 1185 (PIN 4 there). PIN P5 can be connected to a second ground line 8 and assigned in accordance with ISO 1185 (PIN 1 there).

Electrical loads, for example a vehicle lighting system L1, which are disconnected from the control device 1 are connected to the second ground line 8. A brake light L2 is situated between the second power supply line 7 and the second ground line 8 and is switched on and off by a switch S2.

Figure 2:
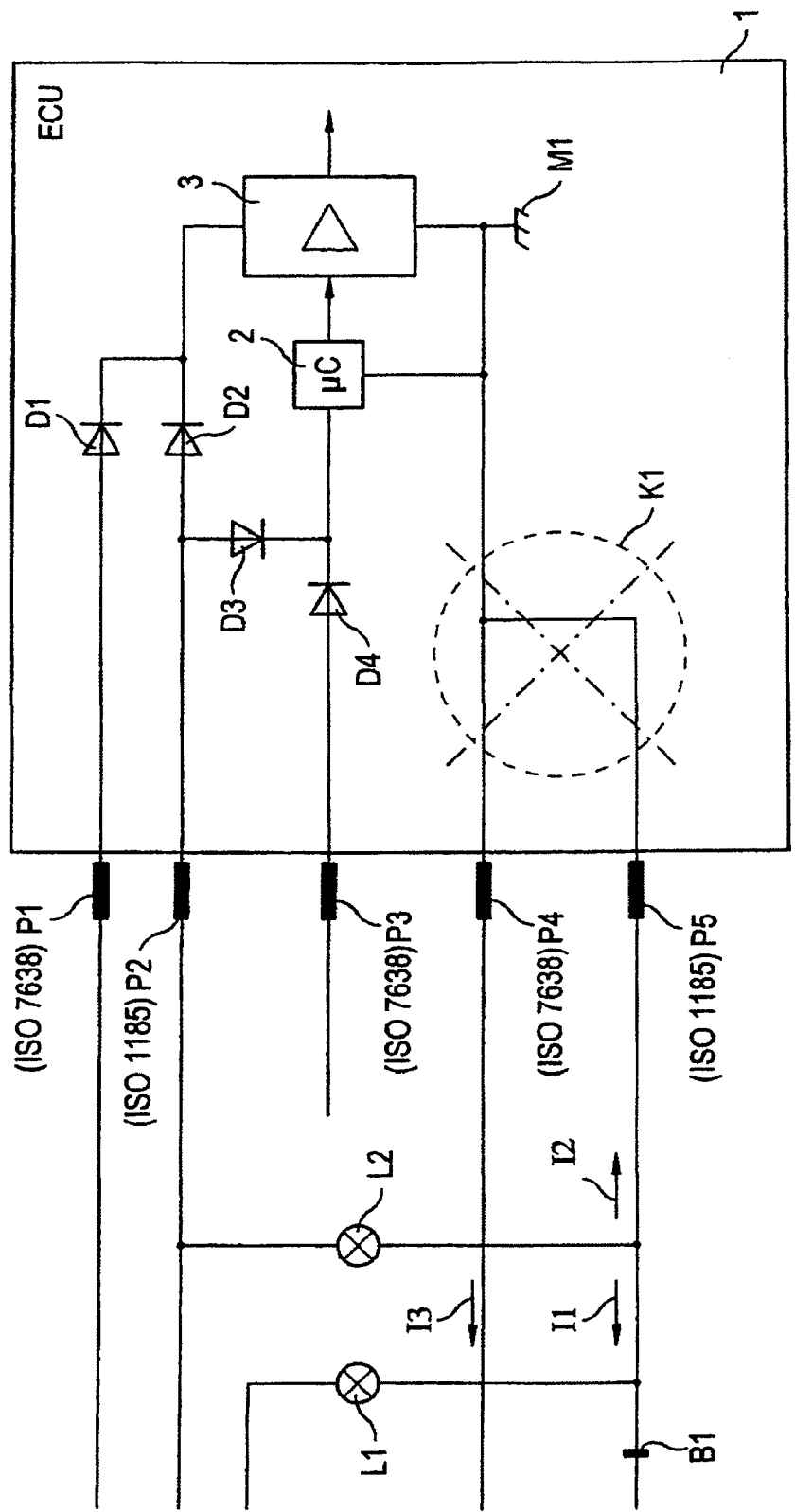
FIG. 2 shows a basic circuit diagram for explaining the problem addressed by the present invention.
Figure 3:
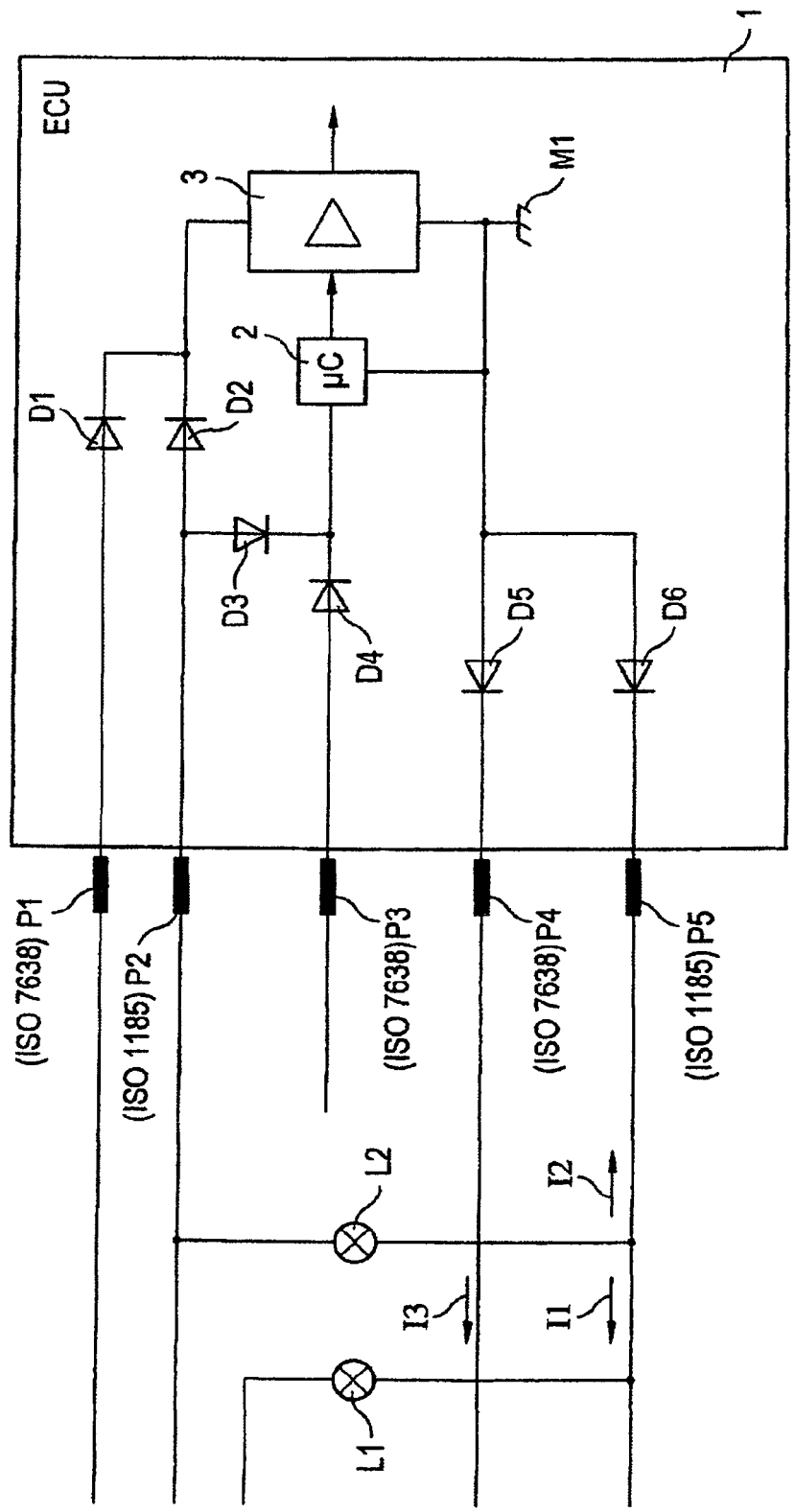
FIG. 3 shows a basic circuit diagram of a circuit arrangement according to the prior art.

As already described in connection with FIGS. 2 and 3, the two power supply lines 4 and 7 are decoupled by the diodes D1 and D2 and connected to the output stage 3 which is controlled by a microcontroller 2. The line 6 is connected to a control input 13 of the microcontroller 2 via the PIN P3 and a diode D4. The microcontroller 2 and the output stage 3 are each directly connected to the first ground line 5 via the PIN P4 and therefore are at the ground potential M1.

The second power supply line 7 is connected to the control input 13 of the microcontroller 2 via a diode D3, and therefore this control input is supplied with battery voltage both when the ignition is switched on, via the line 6, and also when the brake light L2 is switched on by the switch S2, via the line 7.

The first ground line 5 and the second ground line 8 can be connected by a switch S1. This switch S1 can be controlled by a logic circuit 9, with a first input 10 of the logic circuit 9 being connected to the second power supply line 7, a second input 11 of the logic circuit 9 being connected to the first ground line 5, and a third input 12 of the logic circuit 9 being connected to the second ground line 8.

During normal fault-free operation, power is supplied to the control device 1 via the lines 4, 5 and 6. In particular, the current I3 can flow away only via the first ground line 5. Even when the brake is operated and therefore the brake light L2 is switched on, the current consumed by the electronic control device 1 flows away solely via the first ground line 5, whereas the current required by the brake light L2 (switch S2) flows via the lines 7 and 8, but this not influencing the current for the control device 1. In particular, potential shifts on the second ground line 8 do not have any influence on the power supply to the control device 1.

In the event of a fault, in which the first ground line 5 is faulty and, in particular, is interrupted, the logic circuit 9 identifies this state and switches on the switch S1, as a result of which the two ground lines 5 and 8 are internally connected, and therefore the current consumed by the control device 1 can then flow away via the ground line 8 (cf. arrow I1).

In the normal case, the microcontroller 2 is supplied with power via the line 6 and PIN P3 when the ignition of the vehicle is switched on. When the brake is operated and therefore the brake light L2 is switched on, the second supply voltage line 7 also conducts battery voltage which reaches the microcontroller 2 via the diode D3 and reaches the output stage 3 via the diode D2. The two possible supply voltages on the lines 4 and 7 for the output stage 3 are decoupled by the diodes D1 and D2, whereas the two possible supply voltages for the microcontroller 2 on the lines 6 and 7 are decoupled by the diodes D4 and D3. A control input of the microcontroller 2 is not illustrated for reasons of clarity.

In principle, the logic circuit 9 identifies whether the first ground line 5 is faulty or interrupted. As soon as the brake is operated, and therefore a voltage is applied to the second power supply line 7, the logic circuit 9 can check the two voltages firstly between the lines 7 and 5 and secondly between the lines 7 and 8. If the ground line 5 is interrupted, the potential of said ground line increases across the internal resistor of the output stage 3, and therefore the voltage difference between the lines 4 and 5 falls below a threshold value, whereas the voltage difference between the lines 7 and 8 should correspond to the voltage difference of the on-board voltage. If the logic circuit identifies this state, the switch S1 is switched through, and therefore the second ground line 8 is also active for the control device 1.

This state is maintained (latched) by the logic circuit 9 until the brake light L2 is switched off again, that is to say the voltage on the line 7 drops. This prevents the switch S1 from being switched through too often, this being possible, for example, on account of a wobbly contact at PIN P4 or the first ground line 5.

The invention claimed is:

1. A circuit arrangement for supplying power to a control device in a motor vehicle, comprising:
    a first power supply line coupled to a first voltage source and having a first ground line; and
    a second power supply line switchably coupled to a second voltage source via a first switch and having a second ground line;
    wherein the control device includes at least five pins, a controllable switch, and a logic circuit,
    wherein each power supply line and ground line is respectively connected to a respective pin of the control device,
    wherein the logic circuit includes a first control input connected to the second power supply line, a second control input connected to the first ground line, and a third control input connected to the second ground line,
    wherein the first ground line and the second ground line are switchably connected by the controllable switch, and
    wherein responsive to a closing of the first switch, the logic circuit checks a first voltage difference between the first and the second control inputs, and checks a second voltage difference between the first and the third control inputs and closes the controllable switch when the first voltage difference falls below a threshold value and the second voltage difference corresponds to a voltage difference of an on-board voltage, and wherein one of the at least five pins is coupled to a third line when an ignition switch of the motor vehicle is on, so that voltage is applied to the third line.

2. The circuit arrangement of claim 1, wherein, after the controllable switch is closed, the logic circuit keeps the controllable switch closed until a voltage on the second power supply line falls below a predetermined value.

3. The circuit arrangement of claim 1, wherein the logic circuit is active only when a minimum voltage is applied to the second power supply line and therefore to the first control input of the logic circuit.

4. The circuit arrangement of claim 1, wherein the controllable switch is a relay.

5. The circuit arrangement of claim 1, wherein the controllable switch includes two field-effect transistors which are connected back-to-back in series and which have reverse diodes that are connected back-to-back.

6. The circuit arrangement of claim 1, wherein the control device includes a microcontroller and an output stage, and wherein ground connections of the microcontroller and the output stage are connected solely to the first ground line when the controllable switch is open.

7. The circuit arrangement of claim 6, wherein a power supply connection of the microcontroller is connected to the second power supply line and to a further line, and wherein the second power supply line and the further line are decoupled from one another by diodes.

8. The circuit arrangement of claim 6, wherein a power supply connection of the output stage is connected to the first power supply line and the second power supply line, and wherein the first power supply line and the second power supply line are decoupled from one another by diodes.

9. The circuit arrangement of claim 1, wherein the second power supply line is connectable to the supply voltage by a brake light switch.

10. The circuit arrangement of claim 1, wherein the control device is a trailer brake control device for a truck trailer.

11. The circuit arrangement of claim 1, wherein, after the controllable switch is closed, the logic circuit keeps the controllable switch closed until a voltage on the second power supply line falls below a predetermined value, and wherein the logic circuit is active only when a minimum voltage is applied to the second power supply line and therefore to the first control input of the logic circuit.

12. The circuit arrangement of claim 11, wherein the controllable switch is a relay.

13. The circuit arrangement of claim 1, wherein the controllable switch includes two field-effect transistors which are connected back-to-back in series and which have reverse diodes that are connected back-to-back, and wherein the control device includes a microcontroller and an output stage, and wherein ground connections of the microcontroller and the output stage are connected solely to the first ground line when the controllable switch is open.

14. The circuit arrangement of claim 13, wherein a power supply connection of the microcontroller is connected to the second power supply line and to a further line, and wherein the second power supply line and the further line are decoupled from one another by diodes.

15. The circuit arrangement of claim 13, wherein a power supply connection of the output stage is connected to the first power supply line and the second power supply line, and wherein the first power supply line and the second power supply line are decoupled from one another by diodes.

16. The circuit arrangement of claim 13, wherein the second power supply line is connectable to the supply voltage by a brake light switch, and wherein the control device is a trailer brake control device for a truck trailer.

17. The circuit arrangement of claim 1, wherein the first switch closes in response to an activation of a brake of the motor vehicle.

18. A circuit arrangement for supplying power to a control device in a motor vehicle, comprising:
a first power supply line coupled to a first voltage source, and having a first ground line; and
a second power supply line switchably coupled to a second voltage source via a first switch; and having a second ground line;
wherein the control device includes at least five pins, a controllable switch, and a logic circuit,
wherein each power supply line and ground line is respectively coupled to a respective pin of the control device,
wherein the logic circuit includes a first control input connected to the second power supply line, a second control input connected to the first ground line, and a third control input connected to the second ground line,
wherein the first ground line and the second ground line are switchably coupled by the controllable switch, and wherein responsive to a closing of the first switch, the logic circuit checks a first voltage difference between the first and the second control inputs, and checks a second voltage difference between the first and the third control inputs and closes the controllable switch when the first voltage difference falls below a threshold value and the second voltage difference corresponds to a voltage difference of an on-board voltage, and
wherein a first one of the connection pins is coupled to the first power supply line, wherein a fourth one of the connection pins is coupled to the first ground line, wherein a third one of the connection pins is coupled to a line when an ignition switch of the vehicle is on, so that voltage is applied to the line, wherein a second one of the connection pins is coupled to the second power supply line, and wherein a fifth one of the connection pins is coupled to the second ground line.

* * * * *